United States Patent [19]

Brandes

[11] Patent Number: 5,946,484

[45] Date of Patent: Aug. 31, 1999

[54] METHOD OF RECOVERING SOURCE CODE FROM OBJECT CODE

[75] Inventor: Frederick A. Brandes, Roswell, Ga.

[73] Assignee: The Source Recovery Company, LLC, Framingham, Mass.

[21] Appl. No.: 08/853,029

[22] Filed: May 8, 1997

[51] Int. Cl.[6] .................................................. G06F 9/45
[52] U.S. Cl. ................................ 395/702; 395/568
[58] Field of Search .................................. 395/702, 703, 395/704, 705, 707, 710, 568

[56] References Cited

U.S. PATENT DOCUMENTS

| 5,307,492 | 4/1994 | Benson | 395/707 |
| 5,577,233 | 11/1996 | Goettelmann et al. | 395/500 |
| 5,586,330 | 12/1996 | Knudsen et al. | 395/705 |
| 5,640,550 | 6/1997 | Coker | 707/4 |
| 5,642,472 | 6/1997 | Cohen | 706/12 |
| 5,671,416 | 9/1997 | Elson | 395/702 |

*Primary Examiner*—Viet D. Vu
*Attorney, Agent, or Firm*—Brian M. Dingman

[57] ABSTRACT

A method of recovering source code from object code, comprising providing a computer program in object code format, disassembling the computer program into assembler code format, including machine instructions and their operands, providing assembler code patterns, and for each such pattern, its equivalent source language command structures, comparing the provided assembler code patterns to the assembler code, to find provided assembler code patterns in the assembler code, and for each such found provided assembler code pattern, assigning to the assembler code portion which makes up the pattern, the equivalent source language command structure.

13 Claims, No Drawings

METHOD OF RECOVERING SOURCE CODE FROM OBJECT CODE

FIELD OF THE INVENTION

This invention relates to the recovery of computer source code from computer object code.

BACKGROUND OF THE INVENTION

Computer software is ubiquitous. Much of the software in use today is derived from software which was first developed years or even decades ago. As such software has been modified, and due to the amount of time which has passed since the software was first developed, important documentation for such software is often missing. As a result, it can be very difficult to review the software and make corrections or additions that require knowledge of the software source code. This is especially problematic in situations in which the software is in continuous use, which is the case with much software running on larger computer systems, such as IBM mainframe computers.

The computer source code is required in order to thoroughly review and analyze programs with many lines of code. Without the source code, it can be necessary to rewrite the software in order to resolve problems, or make changes to the program. Rewriting software is expensive, time consuming and difficult, and may lead to additional problems such as new errors. There is also the consideration that such replacement software must often times work with other existing software, and accomplishing an effective interface between the two may be impossible without the source code for the existing software.

SUMMARY OF THE INVENTION

It is therefore an object of this invention to provide a method of recovering source code from object code.

It is a further object of this invention to provide such a method which obviates the need to rewrite software for which correct source code is not available.

This invention features a method of recovering source code from object code, comprising providing a computer program in object code format, disassembling the computer program into assembler code format, including machine instructions and their operands, providing assembler code patterns, and for each said pattern, its equivalent source language command structure, comparing the provided assembler code patterns to the assembler code, to find provided assembler code patterns in the assembler code, and for each such found provided assembler code pattern, assigning to the assembler code portion which makes up the pattern, the equivalent source language command structure.

The step of disassembling the computer program into assembler code format may include providing in computer memory a listing of object code opcodes, and at least their equivalent assembler code machine instructions, and further, comparing the object code opcodes to the object code, to find opcodes in the object code. For each such found opcode, at least the equivalent assembler code machine instructions may then be assigned. Information concerning the operands associated with each found opcode may also be determined. The determined information may include the type and/or length of the operands associated with each found opcode.

The step of comparing the provided assembler code patterns to the assembler code may include reviewing the assembler code to locate key machine instructions that are within a provided assembler code pattern, to find potential assembler code patterns in the assembler code. The step of comparing the provided assembler code patterns to the assembler code may then further include reviewing found potential assembler code patterns by analyzing one or more further machine instructions having a predetermined relationship to the key machine instruction in the found potential assembler code pattern, which may be done by analyzing one or more operands having a predetermined relationship to the key machine instruction in the found potential assembler code pattern, or analyzing the class of machine instructions in the assembler code, or analyzing the instruction type of machine instructions in the assembler code. The step of comparing the provided assembler code patterns to the assembler code may also include reviewing the assembler code to locate key operands that are within a provided assembler code pattern, to find potential assembler code patterns in the assembler code.

Featured in a more specific embodiment is a method of recovering source code from object code, comprising providing a computer program in object code format, disassembling the computer program into assembler code format, including machine instructions and their operands, the disassembling step including: providing in computer memory a listing of object code opcodes, and at least their equivalent assembler code machine instructions; comparing the object code opcodes to the object code, to find opcodes in the object code; and for each such found opcode, assigning the equivalent assembler code machine instructions. This method also contemplates providing assembler code patterns, and for each such pattern, its equivalent source language command structure, and then comparing the provided assembler code patterns to the assembler code to find provided assembler code patterns in the assembler code. The comparing step includes reviewing the assembler code to locate key machine instructions and key operands that are within a provided assembler code pattern, to find potential assembler code patterns in the assembler code. For each such found provided assembler code pattern, the equivalent source language command structure is assigned to the assembler code portion which makes up the pattern.

This invention more specifically features a method of recovering source code from object code, comprising providing a computer program in object code format, disassembling the computer program into assembler code format, including machine instructions and their operands, the disassembling step including: providing in computer memory a listing of object code opcodes, and at least their equivalent assembler code machine instructions; comparing the object code opcodes to the object code, to find opcodes in the object code; for each such found opcode, assigning the equivalent assembler code machine instructions; and determining information, including operand length and type, for at least some of the operands associated with one or more found opcodes. This method also contemplates providing assembler code patterns, and for each such pattern, its equivalent source language command structure, and then comparing the provided assembler code patterns to the assembler code to find provided assembler code patterns in the assembler code. The comparing step includes: reviewing the assembler code, including analyzing the class of machine instructions in the assembler code, and analyzing the instruction type of machine instructions in the assembler code, to locate key machine instructions that are within a provided assembler code pattern, to find potential assembler code patterns in the assembler code; reviewing found potential assembler code patterns by analyzing one or more further machine instructions having a predetermined relationship to the key machine instruction in the found potential assembler code pattern, and further by analyzing one or more operands having a predetermined relationship to the key machine instruction in the found potential assembler code pattern. For each such found provided assembler code pattern, the equivalent source language command structure is assigned to the assembler code portion which makes up the pattern.

DESCRIPTION OF THE PREFERRED EMBODIMENT

This invention may be accomplished in a method of recovering source code from object code. The preferred embodiment of the method contemplates providing a computer program in object code format, and disassembling the computer program into assembler code format, which includes machine instructions and their operands. Patterns representing assembler code patterns, and their equivalent source language command structures, are stored in computer memory. The program assembler code is then automatically, sequentially compared to the stored assembler code patterns, to locate assembler code patterns in the program assembler code. The equivalent source language command structure is then substituted for each such located assembler code portion which makes up the pattern. By such process, the procedural elements of the source code can be reconstructed from the object code. The data elements of the source code are reconstructed by means of analysis of the length and type of operands.

The first step in the method is disassembling the object code into assembler code. The preferred manner in which such is accomplished will be described in relation to software written for the IBM System/370 Extended Architecture although the method of the invention is appropriate for any software, as long as sufficient information concerning the data and code of the software is available.

IBM has published the "Principles of Operation" for its System/370 Extended Architecture, which includes a detailed definition of the machine instructions performed by computer systems operating in the System/370 extended architecture mode. From the information in this publication, a table of information regarding machine instructions was developed herein. The table is reproduced below as Table I.

TABLE I

```
***************************************************
* Column template                                  *
*      1         2         3         4             *
*1234567890123456789012345678901234567890           *
*F3   UNPK    G   61  6    NO    NO   Z   N   N   2   Y
*96   OI      G   41  4    40    NO   X   N   N   2   Y
***************************************************
*           Cols  Description
*           1-2   Opcode
*           3-4   Extended opcode
*           6-10  Assembler mnemonic
*           12    Instruction class
*           14-15 Instruction format
*                 90   BALR instruction
*                 10   standard RR instruction
*                 11   RR inst with R1 only
*                 12   RR with M1 mask (BCR)
*                 13   RR with immediate value (SVC)
*                 14   RR with R1 and R2 even odd
*                 15   RR with R1 even odd
*                 16   RR with floating regs (0, 2, 4, 6)
*                 17   RR with floating regs R2 (0, 4)
*                 18   RR with floating regs R1 (0, 4)
*                 19   RR with floating regs (both 0, 4)
*                 20   standard RX instruction
*                 21   RX with R1 even odd
*                 22   RX with floating reg (0, 2, 4, 6)
*                 23   RX with floating reg (0, 4)
*                 24   RX with M1 mask (BC)
*                 30   standard RS instruction
*                 31   RS sans R3
*                 32   RS with R1 even odd, sans R3
*                 33   RS with R1 and R3 giving range
*                 34   RS with C1 and C3 giving range
*                 35   RS with R1 and R3 even odd
*                 36   RS with M3 mask
*                 40   SI instruction (format I as hex)
*                 41   SI instruction (format I as character)
*                 50   standard S instruction
*                 51   S sans D2 (B2)
*                 52   S sans opcode2
*                 60   SS with single length
*                 61   SS with 2 lengths
*                 62   SS with 1 length and immediate (SRP)
*                 63   SS with regs instead of lengths
*                 70   standard RRE instruction
*                 71   RRE sans R2
*                 80   standard SSE instruction
*           17    Instruction length
*           19-20 Condition code
*           22-23 Registers modified
*           25    Field operated on
*                 0    None - Address reference
*                 T    None - Address is tagged
*                 X    Hexadecimal
*                 H    Halfword
*                 D    Doubleword
```

TABLE I-continued

```
*          F   Fullword
*          E   Short floating point (Fullword)
*          B   Binary
*          C   Character
*          P   Packed
*          L   Long floating point (16 bytes)
*          Z   Zoned
*          27  Instruction causes loss of control (branch or SVC)
*          29  Privileged instruction
*          31  # of operands (1-3)
*          33  Y = used by deasm (anything else - used only by pdc/cdc/decomp)
*
*          1          2          3          4      <= buffer offset
*1234567890123456789012345678901234567890
*
*          1          2          3          4      <= column count
*2345678901234567890123456789012345678890
*
04    SPM    G   11  2   00  NO  0   N   N   1   Y
05    BALR   G   90  2   NO  30  0   Y   N   2   Y
*05   BALR   G   10  2   NO  30  0   Y   N   2   Y           /* FB299 */
06    BCTR   G   10  2   NO  30  0   Y   N   2   Y
07    BCR    G   12  2   NO  NO  0   N   N   2   Y
*
* BCR extended mnemonics used by decompiler follow
*
07    BER    G   12  2   NO  NO  0   N   N   2   N
07    BHR    G   12  2   NO  NO  0   N   N   2   N
07    BLR    G   12  2   NO  NO  0   N   N   2   N
07    BMR    G   12  2   NO  NO  0   N   N   2   N
07    BNER   G   12  2   NO  NO  0   N   N   2   N
07    BNHR   G   12  2   NO  NO  0   N   N   2   N
07    BNLR   G   12  2   NO  NO  0   N   N   2   N
07    BNMR   G   12  2   NO  NO  0   N   N   2   N
07    BNOR   G   12  2   NO  NO  0   N   N   2   N
07    BNPR   G   12  2   NO  NO  0   N   N   2   N
07    BNZR   G   12  2   NO  NO  0   N   N   2   N
07    BOR    G   12  2   NO  NO  0   N   N   2   N
07    BPR    G   12  2   NO  NO  0   N   N   2   N
07    BR     G   12  2   NO  NO  0   N   N   2   N
07    BZR    G   12  2   NO  NO  0   N   N   2   N
07    CNOP   G   12  2   NO  NO  0   N   N   2   N
*
* End of BCR extended mnemonics used by decompiler follow
*
08    SSK    C   10  2   NO  30  0   N   P   2   Y
09    ISK    C   10  2   NO  30  0   N   P   2   Y
0A    SVC    G   13  2   NO  10  0   Y   N   1   Y
0D    BASR   G   10  2   NO  30  0   Y   N   2   Y
0E    MVCL   G   14  2   00  34  0   N   N   2   Y
0F    CLCL   G   14  2   10  34  0   N   N   2   Y
10    LPR    G   10  2   24  30  0   N   N   2   Y
11    LNR    G   10  2   22  30  0   N   N   2   Y
12    LTR    G   10  2   21  30  0   N   N   2   Y
13    LCR    G   10  2   20  30  0   N   N   2   Y
14    NR     G   10  2   40  30  0   N   N   2   Y
15    CLR    G   10  2   10  NO  0   N   N   2   Y
16    OR     G   10  2   40  30  0   N   N   2   Y
17    XR     G   10  2   40  30  0   N   N   2   Y
18    LR     G   10  2   NO  30  0   N   N   2   Y
19    CR     G   10  2   10  NO  0   N   N   2   Y
1A    AR     G   10  2   20  30  0   N   N   2   Y
1B    SR     G   10  2   20  30  0   N   N   2   Y
1C    MR     G   15  2   NO  31  0   N   N   2   Y
1D    DR     G   15  2   NO  31  0   N   N   2   Y
1E    ALR    G   10  2   00  30  0   N   N   2   Y
1F    SLR    G   10  2   00  30  0   N   N   2   Y
20    LPDR   F   16  2   23  NO  0   N   N   2   Y
21    LNDR   F   16  2   22  NO  0   N   N   2   Y
22    LTDR   F   16  2   21  NO  0   N   N   2   Y
23    LCDR   F   16  2   21  NO  0   N   N   2   Y
24    HDR    F   16  2   NO  NO  0   N   N   2   Y
25    LRDR   F   17  2   NO  NO  0   N   N   2   Y
26    MXR    F   19  2   NO  NO  0   N   N   2   Y
27    MXDR   F   18  2   NO  NO  0   N   N   2   Y
28    LDR    F   16  2   NO  NO  0   N   N   2   Y
29    CDR    F   16  2   10  NO  0   N   N   2   Y
2A    ADR    F   16  2   21  NO  0   N   N   2   Y
2B    SDR    F   16  2   21  NO  0   N   N   2   Y
```

TABLE I-continued

| | | | | | | | | | | | | |
|---|---|---|---|---|---|---|---|---|---|---|---|---|
| 2C | MDR | F | 16 | 2 | NO | NO | 0 | N | N | 2 | Y | |
| 2D | DDR | F | 16 | 2 | NO | NO | 0 | N | N | 2 | Y | |
| 2E | AWR | F | 16 | 2 | 21 | NO | 0 | N | N | 2 | Y | |
| 2F | SWR | F | 16 | 2 | 21 | NO | 0 | N | N | 2 | Y | |
| 30 | LPER | F | 16 | 2 | 23 | NO | 0 | N | N | 2 | Y | |
| 31 | LNER | F | 16 | 2 | 22 | NO | 0 | N | N | 2 | Y | |
| 32 | LTER | F | 16 | 2 | 21 | NO | 0 | N | N | 2 | Y | |
| 33 | LCER | F | 16 | 2 | 21 | NO | 0 | N | N | 2 | Y | |
| 34 | HER | F | 16 | 2 | NO | NO | 0 | N | N | 2 | Y | |
| 35 | LRER | F | 16 | 2 | NO | NO | 0 | N | N | 2 | Y | |
| 36 | AXR | F | 19 | 2 | 21 | NO | 0 | N | N | 2 | Y | |
| 37 | SXR | F | 19 | 2 | 21 | NO | 0 | N | N | 2 | Y | |
| 38 | LER | F | 16 | 2 | NO | NO | 0 | N | N | 2 | Y | |
| 39 | CER | F | 16 | 2 | 10 | NO | 0 | N | N | 2 | Y | |
| 3A | AER | F | 16 | 2 | 21 | NO | 0 | N | N | 2 | Y | |
| 3B | SER | F | 16 | 2 | 21 | NO | 0 | N | N | 2 | Y | |
| 3C | MER | F | 16 | 2 | NO | NO | 0 | N | N | 2 | Y | |
| 3D | DER | F | 16 | 2 | NO | NO | 0 | N | N | 2 | Y | |
| 3E | AUR | F | 16 | 2 | 21 | NO | 0 | N | N | 2 | Y | |
| 3F | SUR | F | 16 | 2 | 21 | NO | 0 | N | N | 2 | Y | |
| 40 | STH | G | 20 | 4 | NO | NO | 0 | N | N | 2 | Y | |
| 41 | LA | G | 20 | 4 | NO | 30 | T | N | N | 2 | Y | |
| *41 | LA | G | 20 | 4 | NO | 30 | X | N | N | 2 | Y | possible use by cobol plist? |
| 42 | STC | G | 20 | 4 | NO | NO | X | N | N | 2 | Y | |
| 43 | IC | G | 20 | 4 | NO | 30 | X | N | N | 2 | Y | |
| 44 | EX | G | 20 | 4 | 50 | 44 | T | N | N | 2 | Y | |
| 45 | BAL | G | 20 | 4 | NO | 30 | T | Y | N | 2 | Y | |
| 46 | BCT | G | 20 | 4 | NO | 30 | T | Y | N | 2 | Y | |
| 47 | BC | G | 24 | 4 | NO | NO | T | N | N | 2 | Y | |

\*
\* BC extended mnemonics used by decompiler follow
\*

| | | | | | | | | | | | |
|---|---|---|---|---|---|---|---|---|---|---|---|
| 47 | B | G | 24 | 4 | NO | NO | T | N | N | 2 | N |
| 47 | BE | G | 24 | 4 | NO | NO | T | N | N | 2 | N |
| 47 | BH | G | 24 | 4 | NO | NO | T | N | N | 2 | N |
| 47 | BL | G | 24 | 4 | NO | NO | T | N | N | 2 | N |
| 47 | BM | G | 24 | 4 | NO | NO | T | N | N | 2 | N |
| 47 | BNE | G | 24 | 4 | NO | NO | T | N | N | 2 | N |
| 47 | BNH | G | 24 | 4 | NO | NO | T | N | N | 2 | N |
| 47 | BNL | G | 24 | 4 | NO | NO | T | N | N | 2 | N |
| 47 | BNM | G | 24 | 4 | NO | NO | T | N | N | 2 | N |
| 47 | BNO | G | 24 | 4 | NO | NO | T | N | N | 2 | N |
| 47 | BNP | G | 24 | 4 | NO | NO | T | N | N | 2 | N |
| 47 | BNZ | G | 24 | 4 | NO | NO | T | N | N | 2 | N |
| 47 | BO | G | 24 | 4 | NO | NO | T | N | N | 2 | N |
| 47 | BP | G | 24 | 4 | NO | NO | T | N | N | 2 | N |
| 47 | BZ | G | 24 | 4 | NO | NO | T | N | N | 2 | N |
| 47 | NOP | G | 24 | 4 | NO | NO | T | N | N | 2 | N |

\*
\* End of BC extended mnemonics used by decompiler follow
\*

| | | | | | | | | | | | |
|---|---|---|---|---|---|---|---|---|---|---|---|
| 48 | LH | G | 20 | 4 | NO | 30 | H | N | N | 2 | Y |
| 49 | CH | G | 20 | 4 | 10 | NO | H | N | N | 2 | Y |
| 4A | AH | G | 20 | 4 | 20 | 30 | H | N | N | 2 | Y |
| 4B | SH | G | 20 | 4 | 20 | 30 | H | N | N | 2 | Y |
| 4C | MH | G | 20 | 4 | NO | 30 | H | N | N | 2 | Y |
| 4D | BAS | G | 20 | 4 | NO | 30 | T | Y | N | 2 | Y |
| 4E | CVD | G | 20 | 4 | NO | NO | D | N | N | 2 | Y |
| 4F | CVB | G | 20 | 4 | NO | 30 | D | N | N | 2 | Y |
| 50 | ST | G | 20 | 4 | NO | NO | F | N | N | 2 | Y |
| 54 | N | G | 20 | 4 | 40 | 30 | X | N | N | 2 | Y |
| 55 | CL | G | 20 | 4 | 10 | NO | F | N | N | 2 | Y |
| 56 | O | G | 20 | 4 | 40 | 30 | X | N | N | 2 | Y |
| 57 | X | G | 20 | 4 | 40 | 30 | X | N | N | 2 | Y |
| 58 | L | G | 20 | 4 | NO | 30 | F | N | N | 2 | Y |
| 59 | C | G | 20 | 4 | 10 | NO | F | N | N | 2 | Y |
| 5A | A | G | 20 | 4 | 20 | 30 | F | N | N | 2 | Y |
| 5B | S | G | 20 | 4 | 20 | 30 | F | N | N | 2 | Y |
| 5C | M | G | 21 | 4 | NO | 31 | F | N | N | 2 | Y |
| 5D | D | G | 21 | 4 | NO | 31 | F | N | N | 2 | Y |
| 5E | AL | G | 20 | 4 | 00 | 30 | F | N | N | 2 | Y |
| 5F | SL | G | 20 | 4 | 00 | 30 | F | N | N | 2 | Y |
| 60 | STD | F | 22 | 4 | NO | NO | D | N | N | 2 | Y |
| 67 | MXD | F | 23 | 4 | NO | NO | D | N | N | 2 | Y |
| 68 | LD | F | 22 | 4 | NO | NO | D | N | N | 2 | Y |
| 69 | CD | F | 22 | 4 | 10 | NO | D | N | N | 2 | Y |
| 6A | AD | F | 22 | 4 | 21 | NO | D | N | N | 2 | Y |
| 6B | SD | F | 22 | 4 | 21 | NO | D | N | N | 2 | Y |
| 6C | MD | F | 22 | 4 | NO | NO | D | N | N | 2 | Y |

TABLE I-continued

| | | | | | | | | | | | | |
|---|---|---|---|---|---|---|---|---|---|---|---|---|
| 6D | DD | F | 22 | 4 | NO | NO | D | N | N | 2 | Y | |
| 6E | AW | F | 22 | 4 | 21 | NO | D | N | N | 2 | Y | |
| 6F | SW | F | 22 | 4 | 21 | NO | D | N | N | 2 | Y | |
| 70 | STE | F | 22 | 4 | NO | NO | E | N | N | 2 | Y | |
| 78 | LE | F | 22 | 4 | NO | NO | E | N | N | 2 | Y | |
| 79 | CE | F | 22 | 4 | 10 | NO | E | N | N | 2 | Y | |
| 7A | AE | F | 22 | 4 | 21 | NO | E | N | N | 2 | Y | |
| 7B | SE | F | 22 | 4 | 21 | NO | E | N | N | 2 | Y | |
| 7C | ME | F | 22 | 4 | NO | NO | E | N | N | 2 | Y | |
| 7D | DE | F | 22 | 4 | NO | NO | E | N | N | 2 | Y | |
| 7E | AU | F | 22 | 4 | 21 | NO | E | N | N | 2 | Y | |
| 7F | SU | F | 22 | 4 | 21 | NO | E | N | N | 2 | Y | |
| 80 | SSM | C | 52 | 4 | NO | NO | B | N | P | 1 | Y | |
| 82 | LPSW | C | 52 | 4 | NO | NO | D | N | P | 1 | Y | |
| 84 | WRD | C | 40 | 4 | NO | NO | B | N | P | 2 | Y | |
| 85 | RDD | C | 40 | 4 | NO | NO | B | N | P | 2 | Y | |
| 86 | BXH | G | 30 | 4 | NO | 30 | T | Y | N | 3 | Y | |
| 87 | BXLE | G | 30 | 4 | NO | 30 | T | Y | N | 3 | Y | |
| 88 | SRL | G | 31 | 4 | NO | 30 | 0 | N | N | 2 | Y | |
| 89 | SLL | G | 31 | 4 | NO | 30 | 0 | N | N | 2 | Y | |
| 8A | SRA | G | 31 | 4 | 21 | 30 | 0 | N | N | 2 | Y | |
| 8B | SLA | G | 31 | 4 | 20 | 30 | 0 | N | N | 2 | Y | |
| 8C | SRDL | G | 32 | 4 | NO | 30 | 0 | N | N | 2 | Y | |
| 8D | SLDL | G | 32 | 4 | NO | 30 | 0 | N | N | 2 | Y | |
| 8E | SRDA | G | 32 | 4 | 21 | 30 | 0 | N | N | 2 | Y | |
| 8F | SLDA | G | 32 | 4 | 20 | 30 | 0 | N | N | 2 | Y | |
| 90 | STM | G | 33 | 4 | NO | NO | F | N | N | 3 | Y | |
| 91 | TM | G | 40 | 4 | 30 | NO | X | N | N | 2 | Y | |
| 92 | MVI | G | 41 | 4 | NO | NO | X | N | N | 2 | Y | |
| 93 | TS | G | 52 | 4 | 40 | NO | X | N | N | 1 | Y | |
| 94 | NI | G | 41 | 4 | 40 | NO | X | N | N | 2 | Y | |
| 95 | CLI | G | 41 | 4 | 10 | NO | X | N | N | 2 | Y | |
| 96 | OI | G | 41 | 4 | 40 | NO | X | N | N | 2 | Y | |
| 97 | XI | G | 41 | 4 | 40 | NO | X | N | N | 2 | Y | |
| 98 | LM | G | 33 | 4 | NO | 98 | F | N | N | 3 | Y | |
| 9C00 | SIO | I | 50 | 4 | 00 | NO | 0 | N | N | 1 | Y | |
| 9C01 | SIOF | I | 50 | 4 | 00 | NO | 0 | N | N | 1 | Y | |
| 9D00 | TIO | I | 50 | 4 | 00 | NO | 0 | N | N | 1 | Y | |
| 9D01 | CLRIO | I | 50 | 4 | 00 | NO | 0 | N | N | 1 | Y | |
| 9E00 | HIO | I | 50 | 4 | 00 | NO | 0 | N | N | 1 | Y | |
| 9E01 | HDV | I | 50 | 4 | 00 | NO | 0 | N | N | 1 | Y | |
| 9F00 | TCH | I | 50 | 4 | 00 | NO | 0 | N | N | 1 | Y | |
| 9F01 | CLRCH | I | 50 | 4 | 00 | NO | 0 | N | N | 1 | Y | |
| AC | STNSM | C | 40 | 4 | NO | NO | B | N | P | 2 | Y | |
| AD | STOSM | C | 40 | 4 | NO | NO | B | N | P | 2 | Y | |
| AE | SIGP | C | 30 | 4 | 00 | 30 | 0 | N | P | 3 | Y | |
| AF | MC | G | 40 | 4 | NO | NO | 0 | N | N | 2 | Y | |
| B1 | LRA | C | 20 | 4 | 00 | 30 | 0 | N | P | 2 | Y | |
| B200 | CONCS | C | 50 | 4 | 00 | NO | 0 | N | P | 1 | Y | |
| B201 | DISCS | C | 50 | 4 | 00 | NO | 0 | N | P | 1 | Y | |
| B202 | STIDP | C | 50 | 4 | NO | NO | D | N | P | 1 | Y | |
| B203 | STIDC | I | 50 | 4 | 00 | NO | 0 | N | N | 1 | Y | # operands unconfirmed |
| B204 | SCK | C | 50 | 4 | 00 | NO | D | N | P | 1 | Y | |
| B205 | STCK | G | 50 | 4 | 00 | NO | D | N | P | 1 | Y | # operands unconfirmed |
| B206 | SCKC | C | 50 | 4 | NO | NO | D | N | P | 1 | Y | |
| B207 | STCKC | C | 50 | 4 | NO | NO | D | N | P | 1 | Y | |
| B208 | SPT | C | 50 | 4 | NO | NO | D | N | P | 1 | Y | |
| B209 | STPT | C | 50 | 4 | NO | NO | D | N | P | 1 | Y | |
| B20A | SPKA | C | 50 | 4 | NO | NO | 0 | N | Q | 1 | Y | |
| B20B | IPK | C | 51 | 4 | NO | NO | 0 | N | Q | 0 | Y | |
| B20D | PTLB | C | 51 | 4 | NO | NO | 0 | N | P | 0 | Y | |
| B210 | SPX | C | 50 | 4 | NO | NO | F | N | P | 1 | Y | |
| B211 | STPX | C | 50 | 4 | NO | NO | F | N | P | 1 | Y | |
| B212 | STAP | C | 50 | 4 | NO | NO | H | N | P | 1 | Y | |
| B213 | RPB | C | 50 | 4 | 00 | NO | 0 | N | P | 1 | Y | |
| B218 | PC | C | 50 | 4 | NO | 18 | 0 | N | Q | 1 | Y | |
| B219 | SAC | C | 50 | 4 | NO | NO | 0 | N | N | 1 | Y | |
| B221 | IPTE | C | 70 | 4 | NO | NO | 0 | N | P | 2 | Y | |
| B223 | IVSK | C | 70 | 4 | NO | 70 | 0 | N | Q | 2 | Y | |
| B224 | IAC | C | 71 | 4 | 40 | 70 | 0 | N | Q | 1 | Y | |
| B225 | SSAR | C | 71 | 4 | NO | NO | 0 | N | N | 1 | Y | |
| B226 | EPAR | C | 71 | 4 | NO | 70 | 0 | N | Q | 1 | Y | |
| B227 | ESAR | C | 71 | 4 | NO | 70 | 0 | N | Q | 1 | Y | |
| B228 | PT | C | 70 | 4 | NO | NO | 0 | N | Q | 2 | Y | |
| B22C | TB | C | 70 | 4 | 00 | 00 | 0 | N | P | 2 | Y | |
| B6 | STCTL | C | 34 | 4 | NO | NO | F | N | P | 3 | Y | |
| B7 | LCTL | C | 34 | 4 | NO | NO | F | N | P | 3 | Y | |
| BA | CS | G | 30 | 4 | 11 | 30 | F | N | N | 3 | Y | |
| BB | CDS | G | 35 | 4 | 11 | 31 | D | N | N | 3 | Y | |

TABLE I-continued

| | | | | | | | | | | | |
|---|---|---|---|---|---|---|---|---|---|---|---|
| BD | CLM | G | 36 | 4 | 10 | NO | X | N | N | 3 | Y |
| BE | STCM | G | 36 | 4 | NO | NO | X | N | N | 3 | Y |
| BF | ICM | G | 36 | 4 | 00 | 30 | X | N | N | 3 | Y |
| D1 | MVN | G | 60 | 6 | NO | NO | C | N | N | 2 | Y |
| D2 | MVC | G | 60 | 6 | NO | NO | C | N | N | 2 | Y |
| D3 | MVZ | G | 60 | 6 | NO | NO | C | N | N | 2 | Y |
| D4 | NC | G | 60 | 6 | 40 | NO | X | N | N | 2 | Y |
| D5 | CLC | G | 60 | 6 | 10 | NO | C | N | N | 2 | Y |
| D6 | OC | G | 60 | 6 | 40 | NO | X | N | N | 2 | Y |
| D7 | XC | G | 60 | 6 | 40 | NO | X | N | N | 2 | Y |
| D9 | MVCK | C | 63 | 6 | 00 | NO | C | N | Q | 3 | Y |
| DA | MVCP | C | 63 | 6 | 00 | NO | C | N | Q | 3 | Y |
| DB | MVCS | C | 63 | 6 | 00 | NO | C | N | Q | 3 | Y |
| DC | TR | G | 60 | 6 | NO | NO | X | N | N | 2 | Y |
| DD | TRT | G | 60 | 6 | 00 | 12 | X | N | N | 2 | Y |
| *DE | ED | D | 60 | 6 | 21 | NO | C | N | N | 2 | Y |
| *DF | EDMK | D | 60 | 6 | 21 | 01 | C | N | N | 2 | Y |
| DE | ED | D | 60 | 6 | 21 | NO | X | N | N | 2 | Y |
| DF | EDMK | D | 60 | 6 | 21 | 01 | X | N | N | 2 | Y |
| E500 | LASP | C | 80 | 6 | 00 | NO | 0 | N | Q | 2 | Y |
| E501 | TPROT | C | 80 | 6 | 00 | NO | 0 | N | P | 2 | Y |
| E8 | MVCIN | G | 60 | 6 | NO | NO | C | N | N | 2 | Y |
| F0 | SRP | D | 62 | 6 | 20 | NO | P | N | N | 3 | Y |
| F1 | MVO | G | 61 | 6 | NO | NO | C | N | N | 2 | Y |
| *F2 | PACK | G | 61 | 6 | NO | NO | C | N | N | 2 | Y |
| *F3 | UNPK | G | 61 | 6 | NO | NO | C | N | N | 2 | Y |
| F2 | PACK | G | 61 | 6 | NO | NO | Z | N | N | 2 | Y |
| F3 | UNPK | G | 61 | 6 | NO | NO | Z | N | N | 2 | Y |
| F8 | ZAP | D | 61 | 6 | 20 | NO | P | N | N | 2 | Y |
| F9 | CP | D | 61 | 6 | 10 | NO | P | N | N | 2 | Y |
| FA | AP | D | 61 | 6 | 20 | NO | P | N | N | 2 | Y |
| FB | SP | D | 61 | 6 | 20 | NO | P | N | N | 2 | Y |
| FC | MP | D | 61 | 6 | NO | NO | P | N | N | 2 | Y |
| FD | DP | D | 61 | 6 | NO | NO | P | N | N | 2 | Y |

Table I includes a list of object code opcodes (columns 1 through 4), and their equivalent assembler code machine instructions. Table I includes, for each opcode, the assembler code mnemonic (columns 6 through 10), the instruction class (column 12), the instruction format (columns 14 through 15), the instruction length (column 17), the instruction condition code (columns 19 through 20), whether or not the instruction modifies any registers (columns 22 through 23), the field upon which the instruction operates (column 25), whether or not the instruction causes loss of control (such as a branch or SVC) (column 27), whether the instruction is privileged (column 29), the number of operands for the instruction (column 31), and a switch to indicate that the description is used by the disassembler when the table is constructed in memory before disassembly commences. A value other than "Y" in this column tells the disassembler to disregard this entry.

Table I is used in the disassembly step as follows. Bytes at even offsets of the object code of the program being recovered into source code are compared to the opcodes in Table I. If a match is found, the byte may potentially be an opcode. Since opcodes only occur at even offsets, bytes at odd offsets are not compared to the table opcodes. Table I utilizes a key consisting of Opcode (columns 1 through 2) and Extended Opcode (columns 3 through 4), and the key must be unique. Because the 07 and 47 opcodes can have multiple mnemonics, the switch in column 33 of Table I allows different uses of the Table (for example by both the disassembler and the decompiler).

During the disassembly step, there is also analysis of the operands which are associated with machine instructions. The types and lengths of the operands are assessed to the extent possible. Many machine instructions require operands of a particular type and/or length. For example, a "load" instruction always references four bytes of storage, while a "load halfword" instruction always references two bytes of storage. A "move immediate" instruction copies one operand value into another. In each such case, the machine instruction implicitly establishes operand length.

Other machine instructions explicitly describe operand lengths. For example, a "move characters" instruction contains a component that provides the precise length of an operand which is associated with the instruction. Thus, during disassembly, for operands whose length has been implicitly or explicitly described, a length attribute is assigned to such operands.

Many machine instructions also provide information about the type of the operand. In Table I, columns 14 and 15 are instruction formats, many of which include information about the type of operand. For instructions with these formats, then, it is likely that both the length and type of operands associated with the instructions will be determined during disassembly. The manner in which operands are analyzed during this disassembly step is that each operand in the program being recovered is examined within the context of both single and multiple instructions, and a length and type attribute is assigned to each occurrence of each operand. For explicitly or implicitly defined operands (type and/or length), such information is definitively established. For operands in which there is no such definitive information, the method assigns a type/length attribute with a less than certain degree of reliability. The method creates tables which hold such attributed operand length and type information, and, where appropriate, the degree of reliability associated with the attribution.

When the entire program has been processed in this fashion, all of the table information for each non-definitively defined operand is analyzed and compared. Any discrepancies among type and/or length attributes are then resolved to the extent possible. For example, the weaker attributions for a particular operand are overridden by stronger attributions until there is only one attribution for the length and type of each operand. The tables are updated accordingly so that they can be used later to reconstruct the data area of the program being reconstructed. Thus, after disassembly, the program which was in object code format is now in assembler code format, including machine instructions and at least some of their operands.

The next step in the method is to review the assembler code to find assembler code patterns which are equivalent to predefined procedural source language command structures, which are models of procedural verbs in the relevant programming language. This is accomplished using short patterns representing patterns of machine instructions and operands which are indicative of a procedural source language command. These patterns are written, and then are stored in computer memory. Such patterns include one or more machine instructions and one or more operands, in a particular relationship to one another, which together indicate the presence of an assembler code format version of the appropriate programming language procedural verb.

The assembler code and the stored assembler code patterns are automatically compared. Examples of the stored programs representing patterns of machine instructions and operands are shown in Examples 1 through 14 below. The description material on lines beginning with asterisks in Examples 1 through 14 are explanatory and do not participate in the methods of this invention.

Each pattern has a designated key machine instruction or key operand, indicated by the double arrow in the "Description" portion of the examples. Such key machine instructions/operands may be found based on the instruction type, or the instruction class, for example. The identification and testing of a "key" machine instruction may be based on a comparison of any of the components or subcomponents of the "key" machine instruction. The components of machine instructions available for the comparisons are: an optional label, a required instruction mnemonic, one to three operands, and the "class" of the instruction mnemonic. The subcomponents of machine instructions available for comparisons are: one or more registers, one or more base registers, one or more displacements, one or more lengths, an index register, a mask, and an immediate value.

In the comparison step, the assembler code is reviewed, and each time a key machine instruction or operand of a pattern in memory is found, an analysis is performed to determine whether a stored pattern has been found. Such analysis is accomplished under direction of the patterns, which are actually short analysis programs which automatically query the assembler code near the found key machine instruction or operand. The pattern matching is capable of reviewing any component of a machine instruction or an assembler instruction. The components of such instructions are described in the IBM System/370 Extended Architecture reference described above. As non-limiting examples of such components and their interrelationship, which are used in the pattern matching accomplished in this comparison step, many of the following manners of identifying patterns are illustrated in the above examples: one or more additional machine instructions having a predetermined relationship to the key machine instruction, for example, a particular machine instruction having a particular spatial relationship to the key machine instruction (as shown in Example 1); one or more operands having a predetermined relationship to the key machine instruction (also shown in Example 1); an analysis of the class and/or type of the additional queried machine instructions (also shown in Example 1); an analysis of the type of the additional queried operands (as shown in Example 5); an analysis of the types of variables within a pattern (as shown in Example 1); and comparisons to components or subcomponents of previously identified machine instructions.

The assembler code patterns used in the compare step are used by the decompiler to produce source code versions of programs from the executable versions of those programs.

Description of Patterns

In the following description of the construction and use of such patterns, the following syntax is used:

Reserved words are shown in UPPERCASE letters.

Words representing information supplied by the pattern developer are shown in lowercase letters (not underlined).

Braces { } enclose alternatives, one of which must be coded.

Brackets [ ] enclose items that can be coded or omitted.

The OR symbol | delineates items in a list.

name    1–8 character pattern name (1st character alphabetic)
xvar    Relative statement number variable expressed in the form
yvar       of STMT# (where # is 1–99)
zvar    or in the form VARc (where c is A–Z).
field    Keyword designating an instruction component. Valid
       keywords are:
       LABEL
       OP1      OP2      OP3
       INST     CLASS
       R1       R2       R3       B1      B2      X2
       D1       D2
       L        L1       L2
       I         I2       I3
       M
       LABEL, OP1, OP2 and OP3 may indicate a prefix by appending
       (#) to the keyword (where # is 1–15).
value    A 1 to 24 character string constant
position    A positional expression of one of 3 forms:
       BEFORE|PRECEDES zvar
       AFTER|FOLLOWS zvar
       BETWEEN zvar1 zvar2
A SOURCE FORMAT statement consists of a source creation directive
variable (src#) and a source creation model character string
(model) as described below. The procedural portion of a source code
program may be created under control of a SOURCE FORMAT statement.
var    Any letter from A–Z
src#    A source creation directive variable of the form SRC#, BFR#,
       BEF# or AFT# (where # is 1–99 and refers to a
       relative statement number within the pattern).
model    A source creation model character string in the format of literal
       text interspersed with operand substitutions and tab directives.
       The operand substitutions take the form of:
       &STMT#.field
       where field includes all of the field keywords described above
       with the exception of CLASS.
       Tab directives take the form of @# where # is a 1 to
       2 digit decimal number representing the column in the output
       line to be tabbed to. The @# must be delimited by blanks
       in order to be interpreted by the pattern description compiler
       as a tab directive. Currently no validity checking exists for
       tab directives and the pattern developer must ensure that tabs
       are specified in ascending order and that a tab directive will
       not result in the formatting of text beyond column 72 (COBOL)
       or column 71 (Assembler).
       Two special forms of models are supported.
       A model consisting only of &LABEL will generate the label of
       the corresponding machine instruction beginning in column 1
       (Assembler) or column 8 (COBOL).
       A model consisting only of SPACER will generate a blank (or
       spacing) line in a COBOL output file.

Illustrative Pattern Example

The following is a simple pattern that illustrates the most basic concepts involved in patterns. This pattern will also serve as a basis for discussion of more advanced techniques later.

Before a pattern can be created, the pattern developer must be able to visually recognize and analyze the machine statements that comprise the high level language construct to be recovered. Pattern programming therefore begins with analysis of special programs written by the developer to provide examples of the various constructs in the high level language. The simple pattern is taken from such a program written to research the Cobol language (specifically OS/VS COBOL compiled with the OPT option). The COBOL statement giving rise to the machine statements is:

PERFORM 0100-INIT THRU 0100-EXIT.

The program, when compiled as described above (and with the PMAP option) gives the following expansion of machine statements for the PERFORM statement. The column headings do not appear in the original listing and are placed here for clarity of discussion:

The LABEL, INST and OPERANDS columns provide an Assembler like image of the object code. Notice that the assembler code does not necessarily produce code that can be reassembled back to an identical object code image of the original program. First, the load (L) instruction has been suppressed. Second, the branch condition (object code 47) instruction employs an extended branch mnemonic instruction (B) that combines the instruction and the condition code mask (object code F) but the condition code mask operand (15) is specified anyway. The purpose of the disassembly is

| VERB | DISP | OBJECT CODE | | | | | | ASSEMBLER CODE | | INTERNALS | |
|---|---|---|---|---|---|---|---|---|---|---|---|
| PERFORM | 00174E | D2 | 03 | D | 250 | D | 27C | MVC | 250(4,13),27C(13) | PSV=1 | VN=01 |
|  | 001754 | 41 | 00 | B | 054 | | | LA | 0,054(0,11) | GN=01 | |
|  | 001758 | 50 | 00 | D | 27C | | | ST | 0,27C(0,13) | VN=01 | |
|  | 00175C | 58 | B0 | C | 2B4 | | | L | 11,2B4(0,12) | PBL=1 | |
|  | 001760 | 47 | F0 | B | 1F6 | | | BC | 15,1F6(0,11) | PN=03 | |
|  | 001764 | | | | | | | GN=01 EQU | * | | |
|  | 001764 | D2 | 03 | D | 27C | D | 250 | MVC | 27C(4,13),250(13) | VN=01 | PSV=1 |

This compile listing serves chiefly to delineate the extent of the machine instructions produced by the compiler for the PERFORM statement but also provides a great deal of information that does not appear in the actual executable program. In fact, the only part of the compile listing that is also a part of the actual program is the object code.

In order to recover the original high level language construct from the object code, the DEASM program is used to disassemble the executable program; analyze; extract; and present additional information, some of it in a format very similar to the "assembler code" column provide by the compile listing. In the following illustration of the disassembled instructions contained in the PERFORM statement, everything shown (except the column headings) is available to the pattern developer for use in identifying a pattern and producing a high level source language construct:

not to produce a valid Assembler version of the program but to supply as much information as possible to the decompile process used to produce a re-compilable high level language source program.

The OBJECT CODE column provides an exact image of the instruction as it appears in the original executable program being recovered. The spaces have been inserted to improve readability and to mimic the manner in which the compile listing displays the object code.

Here is the format in which the disassembled file will appear when the decompiler is begun and before any patterns have been found:

| STMT | LABEL | INST | OPERANDS | OBJECT CODE | | | | | |
|---|---|---|---|---|---|---|---|---|---|
| 19 | | MVC | TGT00250(4),TGT0027C | D2 | 03 | D | 250 | D | 27C |
| 20 | | LA | R0,PGM01764 | 41 | 00 | B | 054 | | |
| 21 | | ST | R0,TGT0027C | 50 | 00 | D | 27C | | |
| 22 | | B | 15,PGM01906 | 47 | F0 | B | 1F6 | | |
| 23 | PGM01764 | DS | 0H | | | | | | |
| 24 | | MVC | TGT0027C(4),TGT00250 | D2 | 03 | D | 27C | D | 250 |

The STMT column provides the absolute statement number of the instruction within the file. In the example, the first MVC instruction appears as the nineteenth (19th) instruction or statement in the file that is processed by the decompiler.

| STMT | PATTERN | PTID.STMT | LABEL | INST | OPERANDS |
|---|---|---|---|---|---|
| 19 | | | | MVC | TGT00250(4),TGT0027C |
| 20 | | | | LA | R0,PGM01764 |
| 21 | | | | ST | R0,TGT0027C |
| 22 | | | | B | 15,PGM01906 |
| 23 | | | PGM01764 | DS | 0H |
| 24 | | | | MVC | TGT0027C(4),TGT00250 |

Based on the above material available to the decompile process and an appropriate pattern to identify the object code associated with the PERFORM and then format a PERFORM source code statement, there will be produced a final recovered PERFORM statement that will appear as follows:

PERFORM PGM01906 THRU TGT00027C-EXIT

Here is the pattern that will produce the desired results. The [#] on the far right are for easy identification of the statements being discussed and are not a part of the pattern:

```
BAL COBOL                                                     [01]
                                                              [02]
*   ********************************************** *          [03]
*   PERFORM                                        *          [04]
*                                                  *          [05]
*   SIMPLE PERFORM STATEMENT TO ILLUSTRATE PATTERN *          [06]
*   PROGRAMMING BASICS.                            *          [07]
*                                                  *          [08]
*     DATE       MAINTID      BY DESCRIPTION       *          [09]
*     03/07/97                FB EXAMPLE FOR TUTORIAL *        [10]
*                                                  *          [11]
*     STMT      LABEL INST       OPERANDS          *          [12]
*                                                  *          [13]
*  =>   1             MVC        TGTxxxxx  TGTyyyyy *         [14]
*       ...                                        *          [15]
*       2             UCOND      15        label   *          [16]
*       .                                          *          [17]
*       3             MVC        TGTyyyyy  TGTxxxxx *         [18]
*                                                  *          [19]
*   ********************************************** *          [20]
pattern PERFORM                                               [21]
                                                              [22]
find    stmt1    inst       eq MVC                            [23]
test    stmt1    op1(3)     eq TGT                            [24]
test    stmt1    op2(3)     eq TGT                            [25]
test    stmt1    1          eq 03                             [26]
                                                              [27]
find    stmt3    op1(8)     eq stmt1    op2    after stmt1    [28]
test    stmt3    op2(8)     eq stmt1    op1                   [29]
test    stmt3    inst       eq MVC                            [30]
test    stmt3    1          eq 03                             [31]
                                                              [32]
stmt2   2                   before stmt3                      [33]
test    stmt2    class      eq UNCONDITIONAL                  [34]
                                                              [35]
bfr1 PERFORM &stmt2.op2 THRU &stmt1.op2-EXIT                  [34]
                                                              [37]
pend                                                          [38]
```

Elements of the example pattern:

[1] is not a part of the pattern proper. This MACHINE/LANGUAGE statement appears as the first non comment statement in each pattern description source file and serves to identify the machine code instruction set and the source language of the patterns in the file.

Statements [02], [22], [27], [32], [35] and [37] are BLANK lines inserted description to improve its readability. These statement are ignored by the pattern description compiler.

Statements [3] thru [20] are COMMENT statements used to document the pattern. Comments are indicated by an asterisk in column 1. Comments can appear anywhere in the pattern description source file. These particular comments follow an established convention that allows pattern developer(s) to quickly analyze the pattern description.

Statement [21] is the PATTERN statement. Only one pattern statement is permitted per pattern description. The pattern statement indicates the start of a pattern description and also specifies the name of the pattern. During decompilation the name appears as the operand of a DECOMP FIND command and therefore must be unique within each knowledge base. A knowledge base is one or more directories containing the compiled pattern descriptions that are used during decompilation. The appropriate knowledge base is specified at the start of a decompilation via the DECOMP PATH command.

Statement [38] is the PEND statement and indicates the end of a pattern description. Like the pattern statement only a single pend statement is permitted in a pattern description.

Because pattern descriptions are delineated by pattern and pend statements it is possible to have multiple pattern descriptions in a single pattern description source file. This is highly desirable since all patterns for a particular type of high level language construct or for a particular version or release of a compiler can then be maintained in the same source file.

Statement [23] is the first of the FIND statements in the pattern and the machine instruction that it identifies is referred to as the KEY instruction. The key instruction in a pattern is generally the instruction that is most unique and therefore most easily identified during the decompiler's search for patterns. Note that the syntax of the find statement would have allowed the pattern developer to code this statement in several alternate ways including but not limited to:

```
find stmt1 op1(3) eq TGT
find stmt1 op2(3) eq TGT
```

Because the instructions in the PERFORM pattern are not very unique, in and of themselves, the pattern description could have used stmt2 or stmt3 as the key instruction with little detriment to the overall efficiency of the decompiler's search for this type of PERFORM patterns. A pattern containing a very unique instruction should always employ that unique instruction as the key instruction. In addition, the identification of instructions within a pattern should generally proceed from the most specific or unique to the least specific or unique.

During execution of a pattern description program, when a find statement matches an instruction in the program being recovered then a pattern hit (or simply a hit) is said to have occurred. When a hit occurs the decompiler assigns the instruction's absolute statement number to the pattern description's relative statement number. This association is known as statement assignment.

While FIND statements are used by the decompiler to locate specific machine instructions, TEST statements such as statements [24] thru [26] are used to test a previously assigned instruction for the essential characteristics associated with the given pattern. If any of the tests fails then the decompiler will perform what is referred to as BACK-TRACKING.

Backtracking is a process in which the decompiler rejects the statement that the test failed on. This is done through a process known as unassignment in which the association of the program's absolute statement number and the pattern's relative statement number is broken. Backtracking then resumes the search for the next statement that might fit the criteria. In the example, assuming the decompiler had at some point identified (via the find statement [23]) the following statement as stmt1:

| STMT | LABEL | INST | OPERANDS | OBJECT CODE |
|---|---|---|---|---|
| 13 | | MVC | TGT00218(8),TGT00220 | D2 08 D 218 D 220 | the first and second test statements [24] & [25] would have passed but the third test [26] would have failed. At that point the decompiler would reject this particular MVC instruction as a potential stmt1 and would resume the search for stmt1 at the next instruction after or before the rejected MVC instruction depending on the direction of search for the instruction.

Statement [33] introduces the ASSIGNMENT statement. Assignment statements are employed instead of find statements when the location of a statement is fixed in relation to a previously assigned statement. Assigning absolute program statements to relative pattern statements is extremely efficient in comparison to find statements and should be used whenever possible. Note however that stmt2 could have been located via to a find statement as follows:

find stmt2 class eq UNCONDITIONAL between stmt1 stmt3

During execution of this pattern description program each find and test statement following the pattern statement has been applied in turn to the disassembled program. Understanding this top down order of execution is fundamental to correct pattern development since subsequent find and assignment statements generally make use of previously assigned statements within the pattern. Note that the find [28] for stmt3 requires that stmt1 be known and the assignment [33] for stmt2 requires that stmt3 be known. In addition, the tests at [24]–[26]; [29]–[31] and [34] all depend on successful assignment of the relative pattern statement(s) involved in each test.

In the example, the find and test statements from [23] thru [34] serve to identify the presence of a PERFORM in the disassembled program. When program execution successfully reaches the first SOURCE FORMAT statement then the pattern is said to be found and the decompiler makes the assignment of the pattern's relative statements to the program's absolute statements permanent. The first, in fact only, source format statement in the pattern description is the bfr1 statement at [36] and when execution successfully terminates when the bfr1 is encountered the decompiler display of the newly found pattern will appear as:

| STMT | PATTERN | PTID. STMT | LABEL | INST | OPERANDS |
|---|---|---|---|---|---|
| 19 | PERFORM | 28.1 | | MVC | TGT00250(4), TGT0027C |
| 20 | PERFORM | 28 | | LA | R0,PGM01764 |
| 21 | PERFORM | 28 | | ST | R0,TGT0027C |
| 22 | PERFORM | 28.2 | | B | 16,PGM01906 |
| 23 | PERFORM | 28 | PGM01764 | DS | 0H |
| 24 | PERFORM | 28.3 | | MVC | TGT0027C(4), TGT00250 |

Notice that the name of the pattern, PERFORM, has been placed on each statement found to be a part of the pattern and that a pattern id or PTID of 28 has been assigned to the pattern. Pattern ids are assigned in the order that patterns are found so this PERFORM was actually the twenty eighth (28th) pattern found during the decompile. Note that each relative statement within the pattern is also identified (the second STMT column).

Source formatting occurs after all patterns have been found. Source formatting occurs under the control of one or more source format statements that appear at the end of the pattern description immediately prior to the pend statement. As mentioned earlier, the PERFORM pattern has a single source format statement, the bfr1 at [36]. This statement directs the decompiler to generate a high level language source statement before the program's absolute statement associated with the pattern's relative statement number 1. The source statement will be composed of four character strings separated by single spaces as follows: the literal "PERFORM" followed by the second operand (.op2) of the absolute statement associated with relative statement two (&stmt2) followed by the literal "THRU" followed by the second operand (.op2) of the absolute statement associated with relative statement one (&stmt1) suffixed by the literal "-EXIT". Thus the final source statement will be:

PERFORM PGM01906 THRU TGTOO27C-EXIT

[End of Illustrative Pattern Example]

The MACHINE/LANGUAGE statement: The machine/language statement must appear as the first non comment, non blank statement in a pattern description source file.

This statement identifies the machine language or machine architecture of the pattern descriptions in the file as well as the high level source language of the pattern descriptions in the file.

Although assembler is not normally considered a high level source language, in part because each assembler instruction generates a single machine instruction, the fact remains that IBM assembler language has always supported macro programming.

Assembler macros closely mimic high level language statements in that they generally expand to multiple machine instructions and these machine instructions can differ from one expansion of a macro to another depending on the parameters specified on the macro.

The PATTERN statement: The pattern statement indicates the beginning of a pattern description within the current pattern description source file (extension of PDS). This is a required statement in every pattern description.

The pattern statement takes a single operand in the form of a one to eight (1–8) character name which identifies the pattern being described. Pattern names may include any characters supported by the DOS file naming convention.

A pattern name should be unique within the knowledge base of which it is a part. This requirement exists because each pattern description is compiled by the pattern description compiler (PDC.EXE) and is saved in the knowledge base as a distinct file with the pattern name as the file name and with an extension of PTN. When the decompiler attempts (via a FIND pattern name command) to find a pattern in the program being recovered it searches the current knowledge base for the PTN file with the given pattern name. Thus only the first such file in the path comprising the current knowledge base can actually be used during a decompile.

Examples of valid statements:

PATTERN PERFORM

PATTERN MVEMVC

PATTERN MVE110

The PEND statement: The pend statement indicates the end of a pattern description in a PDS file. This is a required statement in every pattern description. Pend is coded without operands.

The NONCONTIGUOUS statement: Normally, it is assumed that a high level language construct generates contiguous object code. This has two practical implications during decompilation. First, when a pattern is being searched for and one or more statements have already been identified and the search encounters assembler statements already identified with another pattern then backtracking is automatically invoked on the theory that one pattern cannot cross over a previously identified pattern. Also, when a pattern is found by the decompiler, all statements from the first physical statement identified as part of the pattern through the last physical statement identified as part of the pattern are considered a part of the pattern and are assigned to the pattern even when they are not specifically identified via a find or an assignment statement. As such these statements are not eligible to be considered as a part of any other pattern. The only exception to these rules is made for label statements of the form "label DS 0H".

The noncontiguous statement allows the developer to override the previously stated rules and to allow all unassociated assembler statements to be considered for inclusion in the noncontiguous pattern being searched for. In addition, when a noncontiguous pattern is located, the decompiler will not assign any assembler statements internal to the noncontiguous pattern to that pattern, thereby leaving these statements eligible for consideration as parts of other patterns found later during the decompile process.

Most noncontiguous patterns involve COBOL statements that provide for alternate paths of execution such as IF and READ AT END. The following is an IF pattern description and a found IF pattern illustrating the utility of the noncontiguous statement:

```
*   ******************************************************   *
*       STMT    LABEL    INST    OPERANDS                   *
*       2                PACK    TGTxxxxx    . . .           *
* =>    3                CP      TGTxxxxx    -TGT            *
*       5                COND    . . .       label1          *
*       . . .                                                *
*       8       label1   DS      0H                          *
*   ******************************************************   *
pattern IF41
noncontiguous
find    stmt3 inst          eq CP
test    stmt3 op1(3)        eq TGT
test    stmt3 op2(3)        ne TGT
stmt5   immediately         after stmt3
test    stmt5 class         eq CONDITIONAL
find    stmt8 label         eq stmt5 op2 after stmt5
stmt2   immediately         before stmt3
test    stmt2 inst          eq PACK
test    stmt2 op1(8)        eq stmt3 op1
bfr2    IF &stmt2.op2 NOT &stmt5.inst &stmt3.op2
aft8    . <= POSSIBLE END OF IF
```

Note that without the noncontiguous statement in the IF pattern description either the IF or the PERFORM would not have been found in the illustrated program depending on which pattern was searched for first.

The RANGE statement: The range statement allows the pattern developer to specify the maximum number of assembler statements that a pattern may range across.

This statement is useful in limiting the search for a pattern under conditions where an unlimited search might encounter a statement that meets the search criteria even though it is not a part of the pattern.

The FIND statement:
Syntax:
FIND xvar field { EQ | NE } value [ position ]
FIND xvar field { EQ | NE } yvar field [ position ]

The find statement initiates a search for an instruction that matches the specified criteria. The search proceeds in the desired direction until a statement matching the criteria is found or the disassembled file is exhausted or the permissible range of statements is exceeded.

The xvar field specifies the part of the instruction that is to be tested for equality or inequality with the value (format 1) or the yvar field (format 2). Refer to the syntax summary for a full explanation of the keywords that may be used as the field.

When a format 2 find statement is specified the yvar must have a value assigned to it via a prior find or assignment statement.

The direction of the search is normally forward through the disassembled file but can be reversed by specifying a BEFORE yvar or PRECEDES yvar position clause. In addition, if the zvar1 value is after the zvar2 value in a BETWEEN position clause then the search will also proceed in the reverse direction.

Statements in the program are generally found based on field criteria limited to LABEL; INST; CLASS; OP1; OP2 and OP3, these being the major features of assembler instructions. Field criteria involving the subcomponents of assembler instructions such as L, R1, B2, D2, I2 etc. are less commonly used in find statements but are permitted.

Some examples of valid find statements are:

```
find stmt1      op2         eq V_ILBODSP0
find stmt5      op1         eq X'FFFF'              after stmt4
find stmt1      inst        eq SR                   before stmt3
find varb       inst        eq MVI                  after varc
find stmt1      op2(4)      eq FILE
find stmt8      class       eq UNCONDITIONAL        after stmt7
find stmt6      label       eq stmt3 op2            after stmt5
finst stmt10    inst        eq MVI                  between stmt6 stmt9
```

The TEST statement:
Syntax:
TEST xvar field { EQ | NE } value
TEST xvar field { EQ | NE } yvar field The test statement checks the xvar field for equality or inequality with the value (format 1) or yvar field (format 2). Refer to the syntax summary for a full explanation of the keywords that may be used as a field.

The xvar must have a value assigned to it via a prior find or assignment statement.

When a format 2 test statement is specified the yvar must have a value assigned to it via a prior find or assignment statement.

When the test succeeds, execution of the pattern description program continues to the next statement in the description.

When the test fails the backtracking process is invoked. Backtracking after a failed test consists of determining the last successful find statement and then resuming the search for a statement that matches the find statement criteria.

Statements in the program are generally tested based on field criteria limited to LABEL; INST; CLASS; OP1; OP2 and OP3, these being the major features of assembler instructions. Test field criteria involving the subcomponents of assembler instructions such as L, R1, I2 etc. are less commonly used in test statements but are permitted.

In some cases subcomponents are the only means of testing an assembler instruction. Two cases will serve as an example of subcomponent tests that cannot be effected by major component tests.

The first case involves any test of a portion of an operand interior to the whole operand. For example, suppose you want to test the length specified in a MVC instruction. The first problem is that the length may or may not appear as part of the first operand in the disassembled code. Even if it does appear in the operand, it will not appear at the start of the operand where it might be tested via the field prefixing feature. In this case you must employ a test field of L to examine the length (or L) component of an SS format instruction in the object code as follows:

test stmt1 l eq 03

Note that the value must appear exactly as it does in the object code.

The second case involves a test for an operand that involves embedded blanks, typically an SI format assembler instruction involving an immediate value of X'40' or C''. The syntax of the test statement does not permit a test as follows:

test stmt1 op2 eq C'' since the pattern description compiler recognizes each blank in the statement as a delimiter and assumes that the value to be tested for is C' rather than C''. A valid way to test the immediate value of such an instruction would be:

test stmt1 i2 eq 40

Note, once again that the value must appear exactly as it does in the object code.

Some examples of valid test statements are:

```
test    stmt6    Inst      eq BALR
test    stmt6    op1       eq R14
test    stmt7    class     eq UNCONDITIONAL
test    stmt10   op1(8)    eq stmt10 op2
test    stmt5    op2(3)    eq TGT
test    stmt1    1         eq 03
test    stmt1    b2        eq 0
```
The ASSIGNMENT statement:
Syntax:
xvar { # | IMMEDIATELY } { AFTER | FOLLOWS } yvar
xvar { # | IMMEDIATELY } { BEFORE | PRECEDES } yvar
xvar = yvar [ { + | - } # ]
xvar = #

The ASSIGNMENT statement provides for the explicit assignment of an absolute statement number to a relative statement number. Typically, the xvar is assigned to the value of the yvar plus or minus some number of statements. For example, if the yvar (stmtl) has a value of 123 then the following assignment statements will both assign a value of 125 to the xvar (stmt2):

stmt2 2 after stmt1 stmt2=stmt1+2

Note that the third format of the assignment statement is equivalent to the first or second format depending on whether the number is added or subtracted. In other words, the plus (+) sign, AFTER and FOLLOWS keywords are all synonymous and the minus (-) sign, BEFORE and PRECEDES keywords are all synonymous.

The third format allows the assignment of the same absolute statement number to more than one relative statement number. This format is frequently used to assign a value to one or more of the VARc type relative statement numbers in preparation for a LOOP or IF construct.

In very rare cases the fourth format of the assignment statement can be employed. This format is useful only when the absolute statement number of a statement is known before a pattern description program is developed. For example, given the knowledge that the first statement in the PROCEDURE DIVISION of a COBOL program is a label statement of the form:

START DS 0H then it is possible to assign this absolute statement to a relative statement by an assignment:

stmt1=1

Instead of employing a find statement:

find stmt1 label eq START

Some examples of valid ASSIGNMENT statements are:

```
stmt2 immediately after stmt1
stmt2 4 before stmt3
vara = stmt2
vara = vara + 1
stmt3 = vara - 1
The IF structure:
Syntax:
IF xvar field { EQ | NE } value
IF xvar field { EQ | NE } yvar field
  . . .
[ ELSE ]
  . . .
ENDIF
```

The IF structure provides for one or two paths through a pattern description program based on the results of the test coded on the IF statement. The structure begins with the IF statement and terminates with the ENDIF statement. Optionally an ELSE statement can be coded to provide for an alternate execution path within the pattern should the test on the IF statement fail.

A pattern description may contain any number of IF structures and up to 8 IF structures can be nested.

Unlike the test statement, backtracking is not invoked should the test on the if statement fail. If the object of such a test is to invoke backtracking or a complete failure of the pattern then the BACKTRACK or FAIL statement must be explicitly coded within the if structure.

Some examples of valid IF structures are:

```
if vara op2 eq 024(,R1)
   stmt2 = vara
else
   stmt2 = vara + 1
endif
if vara inst eq OI
```

-continued

```
        if vara op2 eq C'0'
            stmt2 = vara
        endif
    endif
The LOOP structure:
Syntax:
LOOP
    . . .
    [ WHILE xvar field { EQ | NE } value ]
    [ WHILE xvar field { EQ | NE } yvar field ]
    [ UNTIL xvar field { EQ | NE } value ]
    [ UNTIL xvar field { EQ | NE } yvar field ]
    [ EXITLOOP ]
    . . .
ENDLOOP
```

The LOOP structure provides for iterative processing within a pattern description. The LOOP statement indicates the beginning of the LOOP and the ENDLOOP statement indicates the end of the LOOP. Normally all statements within a loop structure are executed and then the loop is re-iterated.

LOOP structures can be controlled in several ways including the optional TIMES operand on the LOOP statement itself, as well as WHILE, UNTIL and EXITLOOP statements within the LOOP structure. TIMES can be specified only once but there is no limit on the number of WHILE, UNTIL, and EXITLOOP statements. These is also no restriction on the order or placement of WHILE, UNTIL or EXITLOOP statements.

LOOP structures are useful in stepping through several iterations of assembler instructions generated by a COBOL verb that may take multiple operands (such as OPEN or CALL).

Some examples of valid LOOP structures are:

```
    vara = 1
    varb = stmt5
    loop
        varc = varb + 1
        while varc op2(4) eq FILE
            vara = vara + 1
            find varb inst eq MVI after varc
        endloop
        vara = vara + 1
        loop times=vara
            find vard inst eq BALR after varc
            varc = vard
        endloop
        stmt6 = varc + 1
        vara = stmt2 - 1
        loop
            until vara op1(8) ne stmt2 op2
            vara = vara - 1
        endloop
        stmt1 = vara + 1
```

The FAIL statement: The FAIL statement directs the decompiler to fail the pattern description program currently being executed. The effect of a fail statement is to reset the relative statement array for all currently assigned absolute statements and to begin re-execution of the pattern description program. Re-execution begins with the absolute statement immediately following the last key statement found when the program was failed.

Fail statements are typically found interior to IF structures and are generally used to fail a pattern when the if statement detects an assembler statement that precludes identification of the currently assigned statements with the pattern being searched for.

Some examples of valid FAIL statements are:

```
    vara = stmt3 + 1
    if vara inst eq OI
        fail
    endif
    vara = stmt1 - 1
    if vara inst eq MVC
        if vara op1(8) eq stmt1 op1
            fail
        endif
    endif
```

The BACKTRACK statement: The BACKTRACK statement forces the invocation of the backtracking process.

Currently there are no examples of an explicit backtracking process, however, the BACKTRACK statement is designed to operate in a manner similar to the FAIL statement just described. That is, it would be invoked based on success or failure of a test made as part of an IF structure.

The NOSRC and NOCMT statements: The NOSRC and the NOCMT statements allow the developer to control the source file output generated by the decompiler (specifically the DECOMP SOURCE command). The actions taken or not taken based on the presence of NOSRC or NOCMT in the pattern description are predicated on a source/comment suppression switch set in the decompiler and interrogated at source generation time. The source/comment suppression switch is normally set to active (meaning that the NOSRC and NOCMT statements are in effect when encountered in a pattern) but can be set inactive by the recovery technician.

Normally, as each high level language source statement is formatted under control of the SOURCE FORMAT statements in the pattern description, the source statement is written to the output file. Then each assembler statement that is a part of the pattern is written to the output file in the form of a comment.

The NOSRC statement, when active, suppresses the generation of both the high level source statements and any commented assembler statements in the source output file.

The NOCMT statement, when active, suppresses the generation of only the commented assembler statements in the source output file.

NOSRC and NOCMT are mutually exclusive and when encountered pertain only to the pattern description in which they appear.

NOSRC is useful in suppressing all code that is generated as a result of a compiler option such as STATE or FLOW. These options result in the generation of object code. As the object code does not recover back to a high level language statement but rather a compile time option, there is no need to generate any source statements in conjunction with the object code. For example, an OS/VS COBOL program compiled with FLOW will contain multiple assembler statements of the form:

```
    L       R15,V_ILBOFLW1
    BALR    R1,R15
    DC      XL2'xxxx'1
``` and because the FLOW option is detected during the disassembly process, these statements are essentially irrelevant during creation of the recovered source code and can be completely suppressed from the output source file. The following pattern for FLOW identifies the FLOW object code expansions and then suppresses creation of source output when the source file is created:

```
*  ****************************************************************  *
*  FLOW                                                               *
*  Compiler       FLOW option                                         *
*     STMT           LABEL       INST    OPERANDS                     *
*  =>   1                        L       R15         V_ILBOFLW1       *
*       2                        BALR    R1          R15              *
*       3                        DC      ....        ....             *
*  ****************************************************************  *
pattern  FLOW
         find     stmt1  op2  eq  v_ILBOFLW1
         test     stmt1  inst eq  L
         test     stmt1  op1  eq  R15
         stmt2    immediately after stmt1
         test     stmt2  inst eq  BALR
         test     stmt2  op1  eq  R1
         test     stmt2  op2  eq  R15
         stmt3    immediately after stmt2
         test     stmt3 inst eq DC
         NOSRC
         src1     COMPILED WITH FLOW OPTION-STMT # &stmt3.op1
pend
```

The NOCMT statement is useful in suppressing commented assembler statements that are not required by the recovery technician during the final recovery process that follows decompilation. When the SOURCE FORMAT statement(s) for a pattern generate the precise source statements for the pattern then the commented assembler statements are superfluous and if generated would have to be deleted from the source file by the technician without ever being examined. NOCMT prevents the generation of the superfluous assembler comments so that the technician does not have to bother with them during final recovery. The OS/VS COBOL EXIT pattern provides a good example of the utility of NOCMT. Without NOCMT an EXIT statement might be recovered as:

```
              TGT00284-EXIT.
                  EXIT.
*************************************************************
*                                                           *
*************************************************************
*           L      R1,TGT00284
*           BR     R1
``` but given the presence of NOCMT in the EXIT pattern description:

```
*  ****************************************************************  *
*  EXIT                                                               *
*  EXIT statment                                                      *
*     STMT    LABEL  INST  OPERANDS                                   *
*       1            L     R1          TGT . . . . .                  *
*  =>   2            BR    ....        R1          *Unconditional*    *
*  ****************************************************************  *
pattern  EXIT
         find     stmt2  inst eq BR
         test     stmt2  r2 eq 1
         test     stmt2  class eq unconditional
         stmt1    immediately before stmt2
         test     stmt1  inst eq L
         test     stmt1  r1 eq 1
         test     stmt1  op2(3) eq TGT
NOCMT
src1           @8       &stmt1.op2-EXIT.
src1                        EXIT.
src1           SPACER
src1           @7       ****************************************************
src1           @7       *  @72  *
src1           @7       ****************************************************
pend
``` the recovered source code would appear as:

```
              TGT00284-EXIT.
                  EXIT.
*************************************************************
*                                                           *
*************************************************************
```

The SOURCE FORMAT statement:
Syntax:
src# model

The SOURCE FORMAT statement controls the creation of high level language constructs and commentary within the source file for the recovered program. The source file is created following the identification of patterns within the disassembled file based on the DECOMP SOURCE command.

As the decompiler processes the SOURCE command, it selects each statement in turn from the disassembled file. If the statement is identified with a pattern then the pattern description program is read back into memory and formatting of the source proceeds based on the SOURCE FORMAT commands found in the pattern description.

Source formatting is also controlled by the presence of NOSRC and NOCMT commands as described previously.

Each source format statement begins with the src# variable. This variable indicates exactly where the model statement is to be formatted. The # on the src# variable identifies the relative statement number within the pattern where the source statement is to appear. SRC#, BFR# and BEF# all specify that the source statement should be formatted prior to the generated assembler comment of the absolute statement associated with the given relative statement. AFT# specifies that the source statement should be formatted after the generated assembler comment of the absolute statement associated with the given relative statement.

The model variable is a source creation model character string in the format of literal text interspersed with operand substitutions and tab directives. The operand substitutions take the form of:

&STMT#. field where field includes all of the field keywords with the exception of CLASS.

Tab directives take the form of:

@# where # is a 1 to 2 digit decimal number representing the column in the output line to be tabbed to. The @# must be delimited by blanks in order to be interpreted by the pattern description compiler as a tab directive. Currently no validity checking exists for tab directives and the pattern developer must ensure that tabs are specified in ascending order and that a tab directive will not result in the formatting of text beyond column 72 (COBOL) or column 71 (Assembler).

Two special forms of models are supported.

A model consisting only of &LABEL will generate the label of the corresponding machine instruction beginning in column 1 (Assembler) or column 8 (COBOL).

A model consisting only of SPACER will generate a blank (or spacing) line in a COBOL output file.

Some examples of valid SOURCE FORMAT statements are:

```
src1   GOBACK
src1   SORT
src1   INPUT PROCEDURE IS &stmt2.op2
src1   OUTPUT PROCEDURE IS &stmt4.op2
bfr1   INSPECT &stmt1.op2
```

```
bfr1   REPLACING ALL &stmt4.op2 BY &stmt5.op2
src1   READ &stmt1.op1 (BL IS &stmt9.op2)
src10  @12 INTO
src14  @12 AT END
src15  . <= END OF READ
bfr3   IF &stmt3.op1 NOT &stmt4.inst &stmt3.op2
aft6   POSSIBLE ELSE
aft8   . <= POSSIBLE END OF IF
src1   MOVE &stmt1.op2 TO &stmt1.op1
src1   ***** WITH BLANK PADDING *****
```

Sub components of machine instructions

| | | | | | |
|---|---|---|---|---|---|
| R1 | refers to the | R1 | component of | RR, RX, RS | format machine instructions |
| R2 | refers to the | R2 | component of | RR | format machine instructions |
| R3 | refers to the | R3 | component of | RS | format machine instructions |
| X2 | refers to the | X2 | component of | RX | format machine instructions |
| B1 | refers to the | B1 | component of | SI and SS | format machine instructions |
| B2 | refers to the | B2 | component of | RX, RS, S and SS | format machine instructions |
| L | refers to the | L | component of | SS | format machine instructions |
| L1 | refers to the | L1 | component of | SS | format machine instructions |
| L2 | refers to the | L2 | component of | SS | format machine instructions |
| I | refers to the | I | component of | | SVC machine instructions |
| I2 | refers to the | I2 | component of | SI | format machine instructions |
| I3 | refers to the | I3 | component of | | SRP machine instructions |
| M | refers to the | M1 | component of | | BC machine instructions |
| | | M1 | | | BCR machine instructions |
| | | M3 | | | CLM machine instructions |
| | | M3 | | | ICM machine instructions |
| | | M3 | | | STCM machine instructions |
| D1 | refers to the | D1 | component of | SI and SS | format machine instructions |
| D2 | refers to the | D2 | component of | RX, RS, S and SS | format machine instructions |

Each supported machine instruction is described in complete detail in the IBM Principles of Operations manual.

Syntax of the Class Description Language:

Syntax notation:

Reserved words are shown in UPPERCASE letters.

Words representing information supplied by the pattern developer are shown in lowercase letters (not underlined).

Braces { } enclose alternatives, one of which must be coded.

Brackets [ ] enclose items that can be coded or omitted.

The OR symbol ¦ delineates items in a list.

Ellipses . . . indicate one or more items in a list.

```
           BAL
           CLASS name #
           mnemonic . . . mnemonic
           CEND
name       1-24 character class name
#          A unique number assigned to the class
mnemonic   Machine instruction mnemonic as defined in the third
           column in the BALOPS.DAT table.
```

The MACHINE statement: The machine statement must appear as the first non comment, non blank statement in a class description source file.

This statement identifies the machine language or machine architecture of the class descriptions in the file.

The CLASS statement:

Syntax:

CLASS classname #

The class statement indicates the beginning of a class description within the current class description source file (extension of CDS). This is a required statement in every class description.

The class statement requires two operands.

The first operand is the name assigned to the class and is specified in the form of a one to twenty-four (1–24) character string. Class names may include any characters supported by a standard PC keyboard.

The second operand is a unique integer number assigned as the internal identifier of the class.

Class names should be unique.

Examples of valid statements:

CLASS COMPARE 1

CLASS CONDITIONAL 2

CLASS UNCONDITIONAL 3

The CEND statement: The cend statement indicates the end of a class description in a CDS file. This is a required statement in every class description. Cend is coded without operands.

---

The MNEMONIC list statement:
Syntax:
mnemonic . . . mnemonic

---

The mnemonic list statement specifies the machine instruction mnemonics comprising the class.

A maximum of fifty (50) mnemonics may be defined as part of a class.

Up to twenty (20) mnemonics can be specified on a single source line. Class definitions in BAL.CDS

```
CLASS   COMPARE 1
        C       CR      CH
        CS      CDS
        CL      CLR     CLC  CLI  CLM  CLCL
        CP
        TM      LTR
        TRT
CEND
CLASS   CONDITIONAL 2
        BC      BCR
        BH      BHR
        BL      BLR
        BE      BER
        BNH     BNHR
        BNL     BNLR
        BNE     BNER
        BO      BOR
        BP      BPR
        BM      BMR
        BNP     BNPR
        BNM     BNMR
        BNZ     BNZR
        BZ      BZR
        BNO     BNOR
CEND
CLASS   UNCONDITIONAL 3
        B       BR
CEND
CLASS   PACKED  4
        AP
        CP
        DP
        ED
        EDMK
        MP
        SRP
        SP
        ZAP
        PACK
        UNPK
CEND
CLASS   BRANCH 5
        B       BR
        BC      BCR
        BH      BHR
        BL      BLR
        BE      BER
        BNH     BNHR
        BNL     BNLR
```

-continued

```
        BNE     BNER
        BO      BOR
        BP      BPR
        BM      BMR
        BNP     BNPR
        BNM     BNMR
        BNZ     BNZR
        BZ      BZR
        BNO     BNOR
CEND
CLASS   ENTRY   6
        L
        ST
        AH
CEND
CLASS   ENTRY2  7
        L
        LA
        ST
        AH
CEND
CLASS   LOAD    8
        L
        LH
        LA
        LM
        LR
        ICM
        LTR
        LCR
        LNR
        LPR
CEND
```

PDC.EXE—The pattern description compiler

The pattern description compiler is invoked for all knowledge bases as follows: PTN This command file invokes the PDC program for each standard knowledge base during source recoveries.

To compile a single pattern description source file, the following steps are taken:

PTN1 \directory\subdirectory

PDC sourcefile where \directory\subdirectory specifies the location of the source file to be compiled and sourcefile is the one to eight (1–8) character file name of the source file to be compiled. Pattern description source files must have an extension of PDS and PDS is assumed by the pattern description compiler.

Each pattern description, when successfully compiled, generates a pattern description program file in the directory subdirectory containing the original PDS file. The pattern program file is given a name that matches the name specified on the pattern statement and has an extension of PTN.

If all patterns in the source file compile successfully, the compiler will display a message to that effect on the monitor.

If errors are detected during compilation, the compiler will display an error message on the monitor indicating that further information is available in the file PDC.LOG in the directory subdirectory.

After the patterns have been compiled they are available for use via the DECOMP FIND command provided the DECOMP PATH command has been issued to specify the \directory\subdirectory where the PTN files reside.

CDC.EXE—The class description compiler

The class description compiler is executed from the \PTNOS2 directory specifying class description source files (also in the \PTNOS2 directory).

As only one CDS file currently exists, namely BAL.CDS, the process of compiling class descriptions consists of the following commands:

cd \ptnos2 cdc bal

All class descriptions, when compiled, are found in BAL-.CLS.

As CDC executes and each class description is successfully compiled the compiler will display a message on the monitor. If the compiler encounters an error for a class description then an appropriate message will be displayed on the monitor.
[end of Description of Patterns]

EXAMPLES OF PATTERNS

The following fourteen examples illustrate stored patterns for various languages and operating systems, as indicated therein.

Example 1

```
* *******************************************************  *
*  IF                                                       *
*                                                           *
*  A simple COBOL IF statement when program is complied     *
*  with NOOPT option.                                       *
*                                                           *
*         STMT  LABEL    INST         OPERANDS              *
*                                                           *
* =>      1              COMPR        ........  ........    *
*         A              [ ...        ........  PGT  ]      *
*         2              COND         ........  label1      *
*         ...                                                *
*         4    label1    ...          ........              *
*                                                           *
* *******************************************************  *
pattern  IF nonocontiguous
         find     stmt1         eq COMPARE vara     immediately   after                stmt1
         if vara op2(3) eq PGT
         stmt2    2 after stmt1
         else
         stmt2    immediately after stmt1
         endif test     stmt2         eq CONDITIONAL find     stmt4 label   eq stmt2 op2 after stmt2 scr1     IF &stmt1.op1 NOT &stmt2.inst &stmt1.op2
         scr4     ENDIF
pend
```

Example 2

```
* *******************************************************  *
*  IF             - COMPR [.] COND    ... DS                *
*                                                           *
*  A simple COBOL IF statement when program is compiled     *
*  with OPT option.                                         *
*                                                           *
*         STMT  LABEL    INST         OPERANDS              *
*                                                           *
* =>      1              COMPR ...  ........                *
*         A              [ ...      ........    PBL]        *
*         2              COND       ........    label1      *
*         ...                                                *
*         4    label1    DS         0H                      *
* *******************************************************  *
pattern  IF nonocontiguous find     stmt1 class    eq COMPARE vara     immediately   after stmt1
         if vara op2(3) eq PBL
         stmt2    2 after stmt1
         stmt3 = vara
         else
         stmt2    immediately after stmt1
         endif test     stmt2 class        eq CONDITIONAL find     stmt4 label        eq stmt2 op2 after stmt2 bfr1     IF &stmt1.op1 NOT &stmt2.inst &stmt1.op2
         aft4     . <= POSSIBLE END OF IF
pend
```

Example 3

```
* *******************************************************  *
*  GOTO                                                     *
*                                                           *
*  A COBOL GO TO statement when program is complied with    *
*  NOOPT option.                                            *
*                                                           *
*         STMT  LABEL    INST         OPERANDS              *
*                                                           *
*         A    label1    ...          ........              *
*         ...                                                *
*         1              L            ........    PGT       *
* =>      2              UCOND        ........    label1    *
*                                                           *
* *******************************************************  *
pattern GOTO find     stmt2         class         eq UNCONDITIONAL find     vara          label   eq stmt2 op2 before stmt2 stmt1    immediately            before stmt2
         test     stmt1 inst             eq L
         test     stmt1 op2(3)           eq PGT src1     GO TO                  &stmt2.op2
pend
```

Example 4

```
* *******************************************************  *
*  GOTO          - DS ... UNCOND                            *
*                                                           *
*  A COBOL GO TO statement when program is compiled         *
*  with OPT option.                                         *
*                                                           *
*         STMT  LABEL    INST         OPERANDS              *
*                                                           *
*         A    label1    DS           0H                    *
*         ...                                                *
* =>      1              UNCOND       ........    label1    *
*                                                           *
* *******************************************************  *
pattern GOTO find     stmt1 class         eq UNCONDITIONAL find     vara      label     eq stmt1 op2 before stmt1 bfr1     GO TO &stmt1.op2
pend
```

Example 5

```
*    ***********************************************************    *
*  DSP0                                                              *
*                                                                    *
*  OS/VS COBOL DISPLAY statement.                                    *
*                                                                    *
*                                                                    *
*        STMT      LABEL     INST      OPERANDS                      *
*  =>    1                   L         R15              V _          *
                                                        ILBODSP0
*        2                   BALR      R1               R 1 5        *
*        3                   DC        XL2'0001'                     *
*        ...                                                         *
*  4                DC       DC        XL2'FFFF'                     *
*                                                                    *
*    ***********************************************************    *
pattern DSP0 find      stmt1 op2         eq V_ILBODSP0
        test      stmt1 inst        eq L
        test      stmt1 op1         eq R15 stmt2     immediately       after stmt1
        test      stmt2 inst        eq BALR
        test      stmt2 op1         eq R1
        test      stmt2 op2         eq R15 stmt3     immediately       after stmt2
        test      stmt3 inst        eq DC
        test      stmt3 op1         eq XL2'0001' find      stmt4 op1         eq XL2'FFFF' after stmt3 bfr1      DISPLAY
pend
```

Example 6

```
*    *********************************************************    *
*  DSP0LST                                                         *
*                                                                  *
*  DOS COBOL DISPLAY statemnt.                                     *
*                                                                  *
*                                                                  *
*        STMT      LABEL     INST      OPERANDS                    *
*  =>    1                   L         R15         V_ILBODSP0*
*        2                   BALR      R1          R 1 5*
*        3                   DC        XL2'0001'                   *
*        ...                                                       *
*        4                   DC        XL2'FFFF'                   *
*    *********************************************************    *
pattern DSP0LST find      stmt1 op2         eq V_ILBDDSP0
```

-continued

```
        test      stmt1 inst        eq L
        test      stmt1 op1         eq R15 stmt2     immediately       after stmt1
        test      stmt2 inst        eq BALR
        test      stmt2 op1         eq R1
        test      stmt2 op2         eq R15 stmt3     immediately       after stmt2
        test      stmt3 inst        eq DC
        test      stmt3 op1         eq XL2'0001' find      stmt4 op1         eq XL2'FFFF' after stmt3
        src1      DISPLAY
pend
```

Example 7

```
*    ***********************************************************    *
*  DISPLAYS - L L [.] LA BALR                                        *
*                                                                    *
*  A COBOL II DISPLAY statemnt.                                      *
*                                                                    *
*                                                                    *
*        STMT      LABEL     INST      OPERANDS                      *
*        1                   L         Rx          TGT0005C          *
*        2                   L         R15         02C(,Rx)          *
*        [A                  .....     ~R15                          *
*        3                   LA        R1          LIT.....          *
*  =>    4                   BALR      R14         R15               *
*                                                                    *
*    ***********************************************************    *
pattern DISPLAYS
```

```
        find      stmt4 inst       eq BALR
        test      stmt4 op1        eq R14
        test      stmt1 op2        eq R15 stmt3     immediately before stmt4
        test      stmt2 inst       eq BALR
        test      stmt3 op1        eq R1
        vara =    stmt3
        if    vara op1 ne R15
              vara = vara − 1
        endif     vara
        stmt2     = vara
        test      stmt2 inst       eq L
        test      stmt2 op1        eq R15
        test      stmt d2          eq 02C stmt1             immediately before stmt2
test              stmt1 inst       eq L
test              stmt1 r1         eq stmt2 b2
test              stmt op2         eq TGT0005C arc1      DISPLAY plist is &stmt3.op2
pend
```

Example 8

```
* **************************************************** *
* ADD1       - AP NI                                    *
*                                                       *
* COBOL ADD A TO B statement.                           *
* A is defined as a PIC 9(#) COMP-3 (where # is an even *
* number)                                               *
*                                                       *
*       STMT  LABEL  INST   OPERANDS                    *
*                                                       *
* =>    1            AP     ~TGTxxxxx    ~TGT.....      *
*       2            NI     ~TGTxxxxx    X'0F'          *
*                                                       *
* **************************************************** *
pattern  ADD1 find    stmt1 inst        eq AP
        test    stmt1 op1(3)      ne TGT
        test    stmt1 op2(3)      ne TGT stmt2   immediately after stmt1
        test    stmt2 inst        eq NI
        test    stmt2 op1(8)      eq stmt1 op1
        test    stmt2 op2         eq X'0F' src1 ADD &stmt1.op2 TO &stmt1.op1
        src1 @7 * @12 pic of stmt1.op1 is s9(even) comp-3
pend
```

Example 9

```
* **************************************************** *
* MVE060     - MVC MVI MVC                              *
*                                                       *
* MOVE A TO B statement with blank padding.             *
*                                                       *
*       STMT  LABEL  INST   OPERANDS                    *
*                                                       *
*       1            MVC    ~TGTxxxxx    ........       *
* =>    2            MVI    ~TGTxxxxxx   C' '           *
*       3            MVC    ~TGTxxxxx    ~TGTxxxxx      *
*                                                       *
* **************************************************** *
pattern  MVE060 find    stmt2 inst        eq MVI
```

```
        test    stmt2 i2          eq 40 stmt1   immediately  before stmt2
        test    stmt1 inst        eq MVC
        test    stmt1 op1(3)      ne TGT
        test    stmt1 op1(8)      eq stmt2 op1 stmt3   immediately  after stmt2
        test    stmt3 inst        eq MVC
        test    stmt3 op1(8)      eq stmt1 op1
        test    stmt3 op2(8)      eq stmt1 op1 src1 MOVE &stmt1.op2 TO &stmt1.op1
        src1 @7 * @12 *** with blank padding ***
pend
```

Example 10

```
* **************************************************** *
* MVE080      - MVC OI                                  *
*                                                       *
* MOVE A TO B statement with both field's pictures specified. *
*                                                       *
*       STMT  LABEL  INST   OPERANDS                    *
*                                                       *
* =>    1            MVC    ~TGTxxxx     ........       *
*       2            OI     ~TGTxxxx     C'0'           *
*                                                       *
* **************************************************** *
pattern  MVE080 find    stmt1 inst        eq MVC
        test    stmt1 op1(3)      ne TGT stmt2   immediately after stmt1
        test    stmt2 inst        eq OI
        test    stmt2 op1(8)      eq stmt1 op1
        test    stmt2 op2         eq C'0' src1 MOVE &stmt1.op2 TO &stmt1.op1
        src1 @7 * @12 x/9/s9/9v/s9v to 9/9v
pend
```

Example 11

```
* *****************************************************  *
*  EDPIC010 - ? ED [ST] BALR BC MVI MVC UCOND BC          *
*  MVI MVC                                                *
*  MOVE A TO B statement (B has an edited picture clause).*
*                                                         *
*         STMT  LABEL  INST     OPERANDS                  *
*                                                         *
*           1          ...      xxxxxxxx   ........       *
*           2          ED       xxxxxxxx   ........       *
*           A        [ ST       ........   ........ ]     *
* =>        3          BALR     ........   R0             *
*           4          BC       7          012            *
*           5          MVI      xxxxxxxx   C' '           *
*           6          MVC      xxxxxxxx   ........       *
*           7          UCOND    ........   01A            *
*           8          BC       4          01A            *
*           9          MVI      xxxxxxxx   C' '           *
*          10          MVC      ........   xxxxxxxx       *
*                                                         *
* *****************************************************  *
pattern   EDPIC010 find    stmt3 inst      eq BALR
    test    stmt3 op2       eq R0 vara = stmt3 - 1
    if vara inst eq ST
      vara = vara - 1
    endif
    stmt2 = vara
    test    stmt2 inst      eq ED stmt1   immediately   before stmt2
    test    stmt1 op1(8)    eq stmt2 op1 stmt4   immediately   after stmt3
    test    stmt4 inst      eq BC
    test    stmt4 op1       eq 7
    test    stmt4 op2(3)    eq 012 stmt5   immediately   after stmt4
    test    stmt5 inst      eq MVI
    test    stmt5 op1(8)    eq stmt1 op1
    test    stmt5 i2        eq 40 stmt6   immediately   after stmt5
    test    stmt6 inst      eq MVC
    test    stmt6 op1(8)    eq stmt1 op1 stmt7   immediately   after stmt6
    test    stmt7 class     eq UNCONDITIONAL
    test    stmt7 op2(3)    eq 01A stmt8   immediately   after stmt7
    test    stmt8 inst      eq BC
    test    stmt8 op1       eq 4
    test    stmt8 op2       eq stmt7 op2 stmt9   immediately   after stmt8
    test    stmt9 inst      eq MVI
    test    stmt9 op1(8)    eq stmt1 op1
    test    stmt9 i2        eq 40 stmt10  immediately   after stmt9
    teat    stmt10 inst     eq MVC
    test    stmt10 op2(8)   eq stmt1 op1
    src1    MOVE &stmt2.op2 TO &stmt10.op1
    src1    @7 * @12 edited by &stmt1.op2
pend
```

Example 12

```
* *****************************************************  *
*  GM10N                                                  *
*                                                         *
*  MVS Assembler Getmain macro employing SVC 10.          *
*  Length is a decimal digit.                             *
*                                                         *
*         STMT  LABEL  INST     OPERANDS                  *
*           1          LA       R0                ........*
*           2          BAL      R1        label1          *
*         label1       DS       0H                        *
* =>        5          SVC      10                        *
*                                                         *
* *****************************************************  *
pattern   GM10N find    stmt5 inst      eq SVC
    test    stmt5 op1       eq 10 stmt2   2               before stmt5
    test    stmt2 inst      eq BAL
    test    stmt2 op1       eq R1 stmt1   immediately   before stmt2
    test    stmt1 inst      eq LA
    test    stmt1 op1       eq 10 bfr1    GETMAIN R,LV=&stmt1.op2
pend
```

Example 13

```
* *****************************************************  *
*  DFHPC                                                  *
*                                                         *
*  CICS macro level macro.                                *
*                                                         *
*         STMT  LABEL  INST     OPERANDS                  *
*          98          L        R14       CSA000E8        *
* =>       99          BALR     R14       R14             *
*                                                         *
* *****************************************************  *
pattern   DFHPC find    stmt99 inst     eq BALR
    test    stmt99 op1      eq R14
    test    stmt99 op2      eq R14 stmt98  immediately   before stmt99
    test    stmt98 inst     eq L
    teat    stmt98 op1      eq R14
    test    stmt98 op2      eq CSA000E8 src98   DFHPC TYPE=
pend
```

Example 14

```
* *****************************************************  *
*  COMREG                                                 *
*                                                         *
*  DOS assembler COMRG macro.                             *
*                                                         *
*         STMT  LABEL  INST     OPERANDS                  *
*           1          L        R1        20              *
*         ...                                             *
* =>        2          SVC      33                        *
*                                                         *
```

```
 *     ****************************************************     *
pattern  COMREG find    stmt2 inst eq SVC
         test    stmt2 op1 EQ 33 find    stmt1 inst eq L before stmt2
         test    stmt1 op1 eq R1
         test    stmt1 op2 eq 20 src1    comrg
pend
```

Examples 1 and 2 describe the IF example found in Cobol programs. Example 1 is for Cobol programs compiled with the NOOPT option while example 2 is for programs compiled with the OPT option. The only difference in the examples is the location within the program that contains the branch address (prefix of PGT for NOOPT and PBL for OPT). Two classes of instructions are referenced, namely COMPARE and CONDITIONAL.

Examples 3 and 4 also illustrate the difference between Cobol programs insofar as the NOOPT and OPT compile options affect the generated code and illustrate another class of machine instructions named herein UNCONDITIONAL.

Examples 5, 6 and 7 illustrate the sequences of machine instructions created when a Cobol DISPLAY verb is compiled by the OS/VS Cobol, DOS Cobol and Cobol II compilers respectively. The first two are identical except for the name of the Cobol subroutine (ILBODSP0 vs ILBDDSP0) that is invoked to process the DISPLAY request. The third DISPLAY (for COBOL II) is radically different.

Example 8 is for a Cobol ADD and illustrates (superficially) some of the operand analysis capabilities of the expert system of this invention. The instruction associated with stmt2 indicates that the variable being added to has a PICTURE clause of PIC S9(#) COMP-3 where # represents an even number.

Examples 9, 10 and 11 illustrate Cobol MOVE statements to fields defined with various PICTURE clauses. As in example 8, the second SRC1 statement in each of these examples provides a crude level of operand analysis.

Examples 12, 13 and 14 illustrate examples found in Assembler programs that execute on various IBM operating systems or subsystems. Example 12 describes a request for storage (GETMAIN) by a program running on MVS. Example 13 describes a request to the CICS subsystem. Example 14 describes a request for system information by a program running on a VSE system.
[end of Examples of Patterns]

When a pattern is found, the equivalent source language command structure is assigned to the assembler code portion which makes up the pattern. The pattern matching then continues through the entire assembler code. Pattern matching thus effectively replaces portions of the assembler code with the relevant programming language command structures. At this point in the source code recovery, it is also necessary to examine the operands in light of all references to them, including type and length, and any discrepancies therein, as described above. The creation of the data portion of a source code program is preferably based on an analysis of the operands of machine instructions and the types of machine instructions that employ the operands.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of recovering source code from object code, comprising:

providing a computer program in object code format;

disassembling the computer program into assembler code format, including machine instructions and their operands;

providing assembler code patterns, and for each said pattern, its equivalent source language command structure;

comparing the provided assembler code patterns to the assembler code, to find provided assembler code patterns in the assembler code, the comparing step including reviewing the assembler code to locate key machine instructions or key operands that are within a provided assembler code pattern, to find potential assembler code patterns, and then reviewing found potential assembler code patterns by analyzing one or more machine instructions or operands having a predetermined relationship to the key machine instruction or operand in the found potential assembler code pattern, to verify that the potential assembler code pattern is a provided assembler code pattern; and for each such found provided assembler code pattern, assigning to the assembler code portion which makes up the pattern, the equivalent source language command structure.

2. The source code recovery method of claim 1 in which the step of disassembling the computer program into assembler code format includes providing in computer memory a listing of object code opcodes, and at least their equivalent assembler code machine instructions.

3. The source code recovery method of claim 2 in which the step of disassembling the computer program into assembler code format further includes comparing the object code opcodes to the object code, to find opcodes in the object code.

4. The source code recovery method of claim 3 in which the step of disassembling the computer program into assembler code format further includes, for each such found opcode, assigning at least the equivalent assembler code machine instructions.

5. The source code recovery method of claim 4 in which the step of disassembling the computer program into assembler code format further includes determining information concerning the operands associated with each found opcode.

6. The source code recovery method of claim 5 in which the determined information includes the type of the operands associated with one or more found opcodes.

7. The source code recovery method of claim 5 in which the determined information includes the length of the operands associated with one or more found opcodes.

8. The source code recovery method of claim 1 in which reviewing the assembler code for key machine instructions or operands includes analyzing the class of machine instructions in the assembler code.

9. The source code recovery method of claim 1 in which reviewing the assembler code for key machine instructions or operands includes analyzing the instruction type of machine instructions in the assembler code.

10. The source code recovery method of claim 1 further including creating a data portion of the recovered source code based on analysis of said operands of said machine instructions.

11. The source code recovery method of claim 10 in which the step of creating a data portion of the recovered source code includes an analysis of the types of machine instructions that employ said operands.

12. A method of recovering source code from object code, comprising:

providing a computer program in object code format;

disassembling the computer program into assembler code format, including machine instructions and their operands, the disassembling step including: providing in computer memory a listing of object code opcodes, and at least their equivalent assembler code machine instructions; comparing the object code opcodes to the object code to find opcodes in the object code; and for each such found opcode, assigning the equivalent assembler code machine instructions;

providing assembler code patterns, and for each said pattern, its equivalent source language command structure;

comparing the provided assembler code patterns to the assembler code, to find provided assembler code patterns in the assembler code, the comparing step including reviewing the assembler code to locate key machine instructions or key operands that are within a provided assembler code pattern, to find potential assembler code patterns in the assembler code, and then reviewing found potential assembler code patterns by analyzing one or more machine instructions or one or more operands having a predetermined relationship to the key machine instruction or operand in the found potential assembler code pattern, to verify that the potential assembler code pattern is a provided assembler code pattern; and for each such found provided assembler code pattern, assigning to the assembler code portion which makes up the pattern, the equivalent source language command structure.

13. A method of recovering source code from object code, comprising:

providing a computer program in object code format;

disassembling the computer program into assembler code format, including machine instructions and their operands, the disassembling step including: providing in computer memory a listing of object code opcodes, and at least their equivalent assembler code machine instructions; comparing the object code opcodes to the object code, to find opcodes in the object code; for each such found opcode, assigning the equivalent assembler code machine instructions; and determining information, including operand length and type, for at least some of the operands associated with one or more found opcodes;

providing assembler code patterns, and for each such pattern, its equivalent source language command structure;

comparing the provided assembler code patterns to the assembler code, to find provided assembler code patterns in the assembler code, the comparing step including: reviewing the assembler code, including analyzing the class of machine instructions in the assembler code, and analyzing the instruction type of machine instructions in the assembler code, to locate key machine instructions that are within a provided assembler code pattern, to find potential assembler code patterns in the assembler code; reviewing found potential assembler code patterns by analyzing one or more further machine instructions having a predetermined relationship to the key machine instruction in the found potential assembler code pattern, and further by analyzing one or more operands having a predetermined relationship to the key machine instruction in the found potential assembler code pattern; and for each such found provided assembler code pattern, assigning to the assembler code portion which makes up the pattern, the equivalent source language command structure.

* * * * *